(12) United States Patent
Jansen

(10) Patent No.: US 6,918,569 B2
(45) Date of Patent: Jul. 19, 2005

(54) ACTIVE COMBUSTION FUEL VALVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 117 days.

(21) Appl. No.: 10/377,979

(22) Filed: Feb. 28, 2003

(65) Prior Publication Data

US 2003/0168619 A1 Sep. 11, 2003

Related U.S. Application Data

(60) Provisional application No. 60/361,446, filed on Feb. 28, 2002.

(51) Int. Cl.[7] .............................................. F16K 31/02
(52) U.S. Cl. .............................. 251/129.08; 251/129.2; 251/65; 251/298
(58) Field of Search ....................... 251/129.07, 129.08, 251/129.2, 298, 65

(56) References Cited

U.S. PATENT DOCUMENTS

| | | | | |
|---|---|---|---|---|
| 3,532,121 | A | * | 10/1970 | Sciortino et al. ............. 251/65 |
| 3,570,807 | A | * | 3/1971 | Sturman et al. .............. 251/65 |
| 3,982,554 | A | | 9/1976 | Saito et al. |
| 4,193,421 | A | | 3/1980 | Sakakibara et al. |
| 4,285,497 | A | * | 8/1981 | Gottel ..................... 251/129.2 |
| 4,574,841 | A | * | 3/1986 | Hugler .................. 137/625.65 |
| 4,783,047 | A | * | 11/1988 | Baltus et al. ............. 251/129.2 |
| 5,052,174 | A | | 10/1991 | Bak |
| 5,257,639 | A | * | 11/1993 | Prescott et al. ........ 251/129.08 |
| 5,259,415 | A | | 11/1993 | Hess et al. |
| 5,797,266 | A | | 8/1998 | Brocard et al. |
| 5,809,769 | A | | 9/1998 | Richards et al. |
| 5,878,965 | A | | 3/1999 | Coldren et al. |
| 5,961,052 | A | | 10/1999 | Coldren et al. |
| 6,050,081 | A | | 4/2000 | Jansen et al. |
| 6,102,364 | A | | 8/2000 | Busato |
| 6,250,602 | B1 | | 6/2001 | Jansen |
| 6,310,754 | B1 | | 10/2001 | Busato |
| 6,390,129 | B2 | | 5/2002 | Jansen et al. |
| 6,435,472 | B1 | | 8/2002 | Najmolhoda et al. |
| 2002/0027213 | A1 | | 3/2002 | Jensen |
| 2002/0029573 | A1 | | 3/2002 | Gutmark et al. |
| 2002/0079472 | A1 | | 6/2002 | Kumar |

* cited by examiner

Primary Examiner—John Bastianelli
(74) Attorney, Agent, or Firm—Quarles & Brady LLP

(57) ABSTRACT

A fuel metering valve for a gas turbine active combustion control system has a highly responsive pressure balanced valve assembly with either a flapper or clevis member. The valve member is mounted at one end to an armature of a magnetic drive assembly and a movable part of a flexure pivot otherwise fixed to the valve housing. The armature, flexure pivot and valve member are disposed along a main axis. Magnetic flux selectively pulls the armature toward opposite sides of the main axis causing it and the valve member to pivot in the flexure pivot such that an end of the valve member moves toward or away from an orifice in a nozzle passageway to control metering. The flapper is preferably balanced by a diaphragm piston biasing it in the direction of the nozzle passageway. The alternative clevis arrangement is inherently balanced and can meter fuel through multiple nozzle orifices simultaneously.

12 Claims, 7 Drawing Sheets

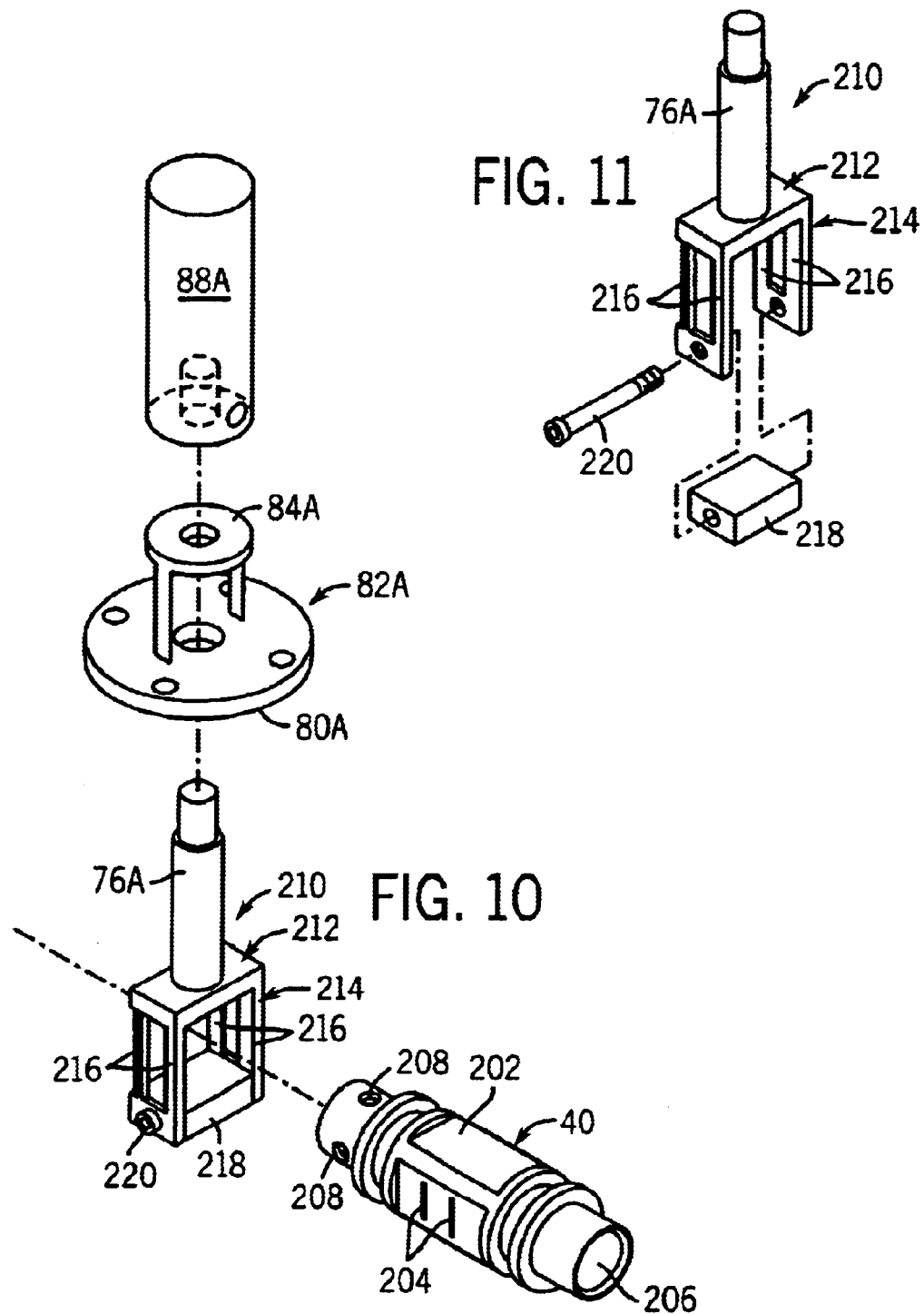

ACTIVE COMBUSTION FUEL VALVE

CROSS-REFERENCE TO RELATED APPLICATION

This application claims benefit to U.S. provisional application Ser. No. 60/361,446 filed Feb. 28, 2002.

STATEMENT OF FEDERALLY SPONSORED RESEARCH OR DEVELOPMENT

Not applicable.

BACKGROUND OF THE INVENTION

1. Technical Field

The present invention relates to fuel metering valves, and in particular, to highly responsive valves suitable for use in high speed active combustion control systems.

2. Description of the Related Art

Many modern gas turbines have combustion cans with low "NOX" burners, that is burners designed to produce low emissions of oxides of nitrogen known to be harmful to the environment. These burners use various lean fuel/air mixing techniques to reduce the levels of nitrogen oxides exhausted. Altering the fuel to air ratio to reduce NOX emissions can cause "screech" or instability in the combustion such that the burner flame is inconsistent or unsustainable. The unstable burning generates pressure fluctuations in the combustion can. These pressure fluctuations cause oscillating waves in the combustion can on the order of several hundred cycles per second. This high frequency vibration can cause rapid breakdown of the combustion components which can send particles or other debris to the turbine blades and thereby cause severe structural damage to the turbine.

Sophisticated combustion control systems have been developed to continuously monitor and actively stabilize the combustion of modern gas turbines to avoid or minimize these adverse affects on the turbine. These systems usually include high speed pressure transducers located, for example, in the combustion can to sense the pressure oscillations arising from the unstable burning. The transducers provide pressure signals to a control computer which processes the signals according to various algorithms to control various combustion components or parameters to counteract the pressure oscillations. Typically, this involves pulsing the fuel sent to the combustion can at very high rates commensurate with the frequency of the pressure oscillations. This is ordinarily accomplished by rapidly operating the fuel metering valve.

Modern gas turbine engines used for utility power generation are very large and capable of a continuous power output between 200–500 megawatts. Such high output requires significant fuel consumption on the order of 200–400 gallons per minute, which must be mixed with air and delivered to the combustion can at a somewhat astonishing rate of roughly 1.25 million cubic feet per minute. The metering valve used in such a system must thus be able to meter very high flow volumes and by operable at very high rates to counter the high frequency pressure oscillations.

Typical metering valves do not meet the extreme performance requirements in gas turbine active combustion control systems. Even the fuel metering valves used in existing active combustion control systems lack the desired responsiveness and efficiency.

Accordingly, an improved fuel metering valve capable of better sustained operation in an active combustion control system of a gas turbine engine is needed.

SUMMARY OF THE INVENTION

The present invention provides a highly responsive fuel metering valve particularly designed for efficient rapid operation required in gas turbine active combustion control systems.

Specifically, the valve has a nozzle passageway disposed between an inlet port and an outlet port in a valve housing. A drive assembly disposed in the valve housing has a movable actuator member disposed along a main axis. A flexure pivot is mounted to the housing and the actuator member to allow pivoting of the actuator member with respect to the main axis. A valve member is disposed along the main axis and can pivot about the flexure pivot with the actuator member to control flow through the nozzle passageway.

In one preferred form, the drive assembly includes a permanent magnet assembly and an electromagnet including a wire coil disposed about a movable armature actuator member. The armature is selectively pulled by magnetic flux toward opposite sides of the main axis causing the valve member to pivot with respect to the main axis and move with respect to the nozzle passageway. The actuator and valve member move in proportion to an input current to the drive assembly.

Preferably, the flexure pivot has a non-moving part that is bolted to the valve housing and a moveable part that is fixed to the armature and one end of the valve member. One or more spokes, preferably two spaced apart 180 degrees, join the two parts of the flexure pivot and are firm but sufficiently flexible to allow movement of the movable part, and thus pivoting of the valve member with respect to the main axis.

The valve member is pressure balanced, that is realizing essentially no net pressure forces from the metered media, either being an inherently balanced clevis member or a flapper balanced by a rolling diaphragm piston assembly.

In the clevis valve member form of the valve, the clevis has a round stem mounted to the actuator member and the movable part of the flexure pivot. An opposite forked end has two slotted prongs defining two pairs of legs with tapered leading edges. The free ends of the prongs are joined by a bridge piece and straddle opposite walls of a section of a valve sleeve (forming the nozzle passageway which is essentially perpendicular to the main axis) having a rectilinear outer periphery through which two pairs of nozzle orifices (slots) are formed. The legs of the clevis are spaced apart in registration with the nozzle orifices such that pivoting of the clevis member moves each leg of the clevis member the same distance with respect to its associated nozzle orifice.

In an alternate form in which the valve member is a flapper, one end is mounted to the armature and the movable part of the flexure pivot. An opposite flat, working end extends transversely across the nozzle passageway (which is essentially perpendicular to the main axis). The working end is arranged and sized to close the nozzle passageway and is biased toward the nozzle passageway by a rolling diaphragm piston. The piston is under a pressure essentially equal to an input pressure at the inlet port by virtue of fuel in communication with the inlet port acting on a diaphragm which presses against a push rod abutting the working end of the flapper. The push rod preferably has a ball end that fits into a socket in the flapper.

The present invention thus provides a highly responsive metering valve suitable for use in an active combustion control system for controlling pressure fluctuations in the combustion chamber of a gas turbine. The valve is able to operate at very high rates required in such applications due to the pressure balancing, low mass and low drag of the valve member which minimize transient forces thereon. The valve member and other components are robust and highly resistant to particle contamination, making the valve highly reliable. The construction of the valve member also permits close mating clearances to be maintained constantly between the nozzle passageway and the valve member with large variations in pressure drops across the metering ports.

These and still other advantages of the invention will be apparent from the detailed description and drawings. What follows are preferred embodiments of the present invention. To assess the full scope of the invention the claims should be looked to as the preferred embodiments are not intended as the only embodiments within the scope of the invention.

BRIEF DESCRIPTION OF THE DRAWINGS

FIG. 10 is an exploded perspective view of the movable valve assembly (with the bridged clevis assembled) together with the nozzle body; and FIG. 11 is an exploded perspective view of the clevis assembly.

DETAILED DESCRIPTION OF THE PREFERRED EMBODIMENTS

Figure 1:
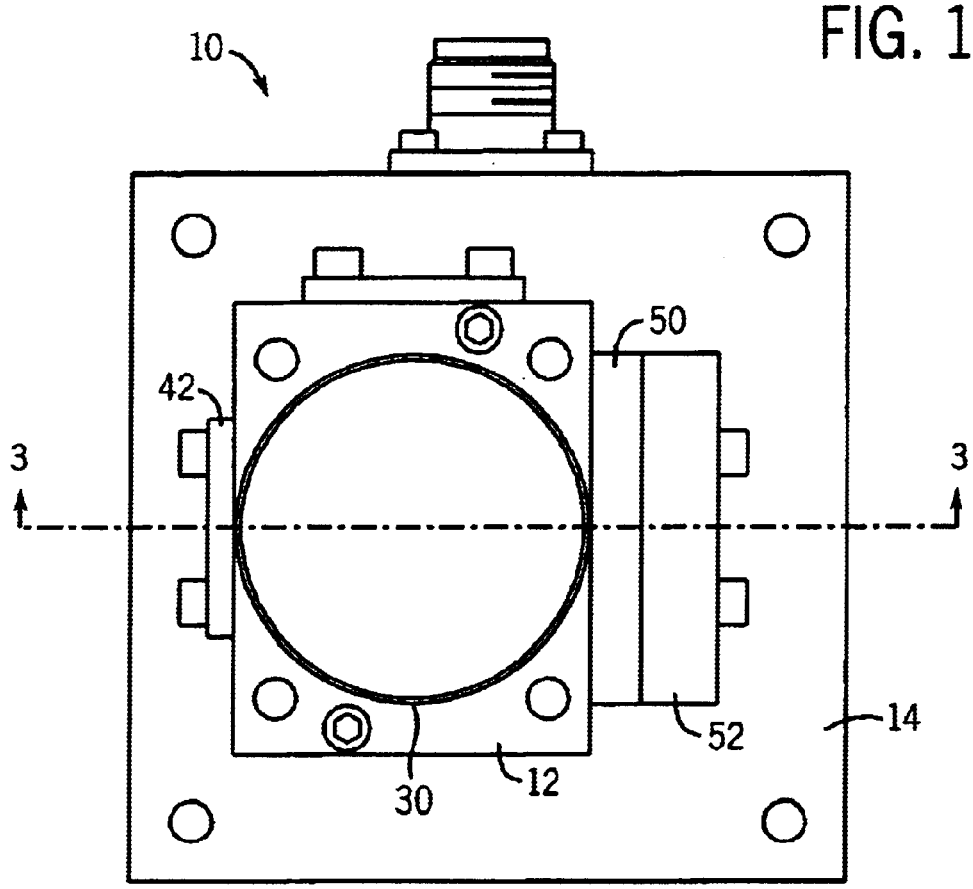
FIG. 1. is an end view of the active combustion fuel metering valve of the present invention.
Figure 2:
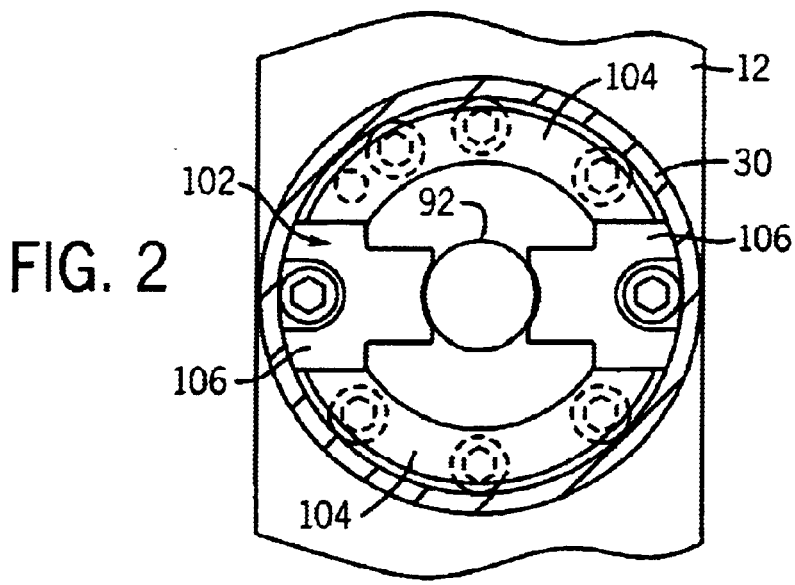
FIG. 2 is a partial sectional view taken along line 2—2 of FIG. 3 showing the permanent magnet arrangement of the valve of FIG. 1.

The present invention provides a high flow volume and flow rate fuel metering valve have attributes designed to make it highly responsive to input drive signals, for example having low weight, pressure balanced actuating components with low dampening, low drag and bluff body forces and low hysteresis, such that is suitable to operate in high rate gas turbine combustion control systems designed to stabilize the combustion process of the burner. Disclosed herein are two preferred embodiments of the valve of the present invention. The first embodiment utilizes a flapper valve member that is pressure balanced by a rolling diaphragm piston. The second embodiment described uses an inherently balanced bridged clevis to simultaneously control metering through multiple metering orifices (four in the described valve). Many of the components in the valves of the two embodiments are the same, particularly the magnetic drive assembly, the primary exception being the use of either a flapper or a clevis valve member. Despite the use of certain differing components both valve embodiments described herein have very similar operational characteristics and are thus suitable for use in like applications. In the drawings, FIG. 2 is common to both embodiments while FIGS. 1 and 3–6 illustrate only the flapper embodiment of the valve and FIGS. 7–11 illustrate only the bridged clevis embodiment.

The flapper valve embodiment will now be described in detail with reference to FIGS. 1–3. The valve 10 includes a valve housing 12 which mounts to a manifold block 14 to which connect fuel lines leading from a fuel supply and to the combustion can of a gas turbine engine (not shown). The manifold block 14 includes internal inlet 16, outlet 18 and balancing 20 passageways (shown in phantom). The inlet 16 and outlet passageways 18 lead from primary ports (such as pressure port 22) to which the fuel lines are connected. Balancing passageway 20 can be routed to the pressure port 22 directly (as shown) or indirectly via the inlet passageway 16 for use in balancing the valve member as discussed below. The valve housing 12 has inlet 24 and outlet 26 ports, sealed by o-rings 28, allowing communication of fuel from the inlet 16 and outlet 18 passageways in the manifold block 14.

The valve housing 12 is enclosed by a cylindrical cover 30 and defines a nozzle chamber 32 concentric with a nozzle axis 34 and a main chamber 36 concentric with a main axis 38 such that the two chambers intersect each other at a right angle. A nozzle body 40 defining nozzle orifice 41 is press fit into the nozzle chamber 32 between the inlet 24 and outlet 26 ports. One end of the nozzle chamber 32 is sealed by a plug 42 mounting an o-ring 44 and bolted to the valve housing 12.

Figure 3:
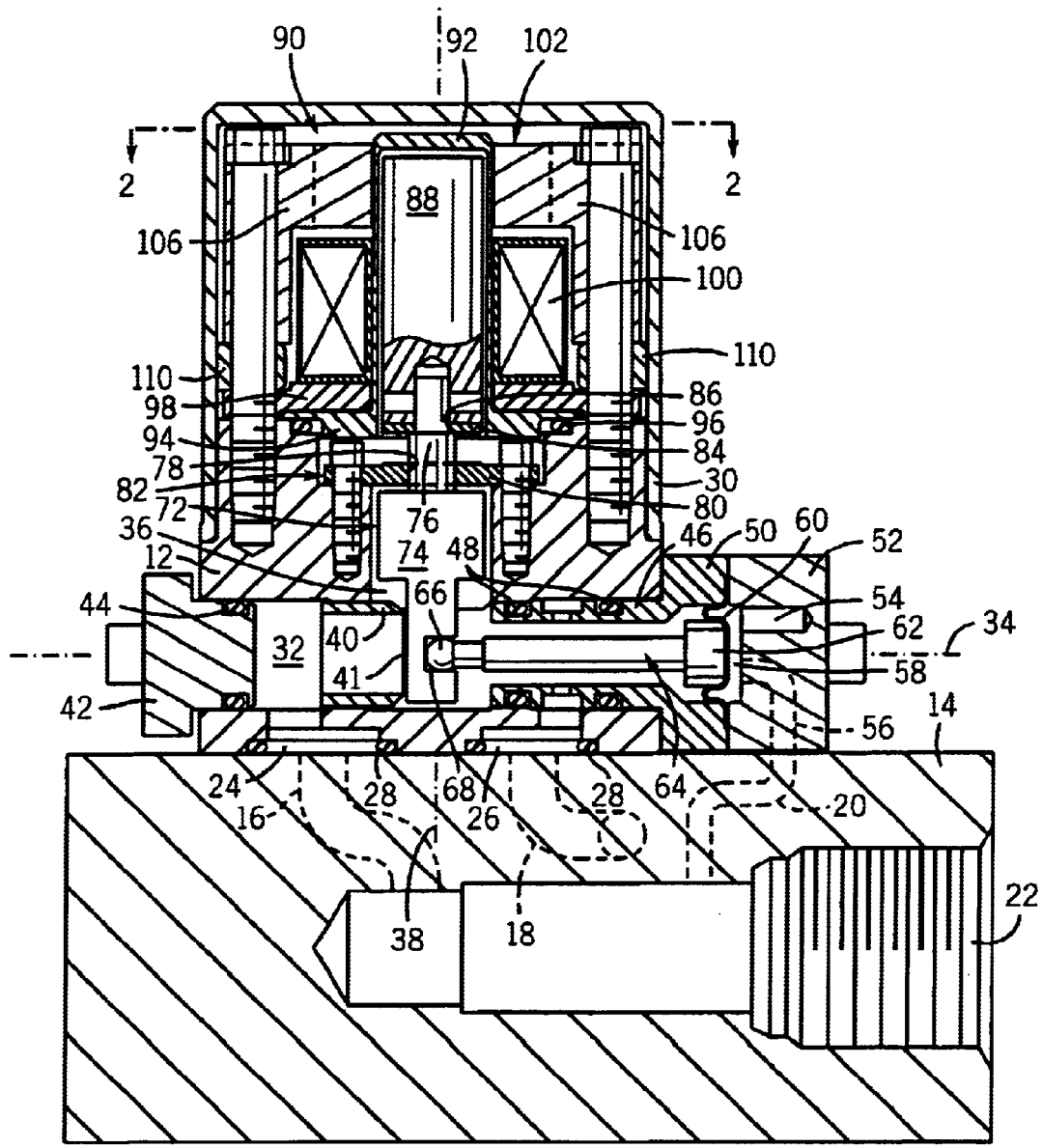
FIG. 3 is a cross-sectional view taken along line 3—3 of FIG. 1 showing a valve according to a first embodiment of the present invention having a diaphragm piston pressure balanced flapper valve member.
Figure 6:
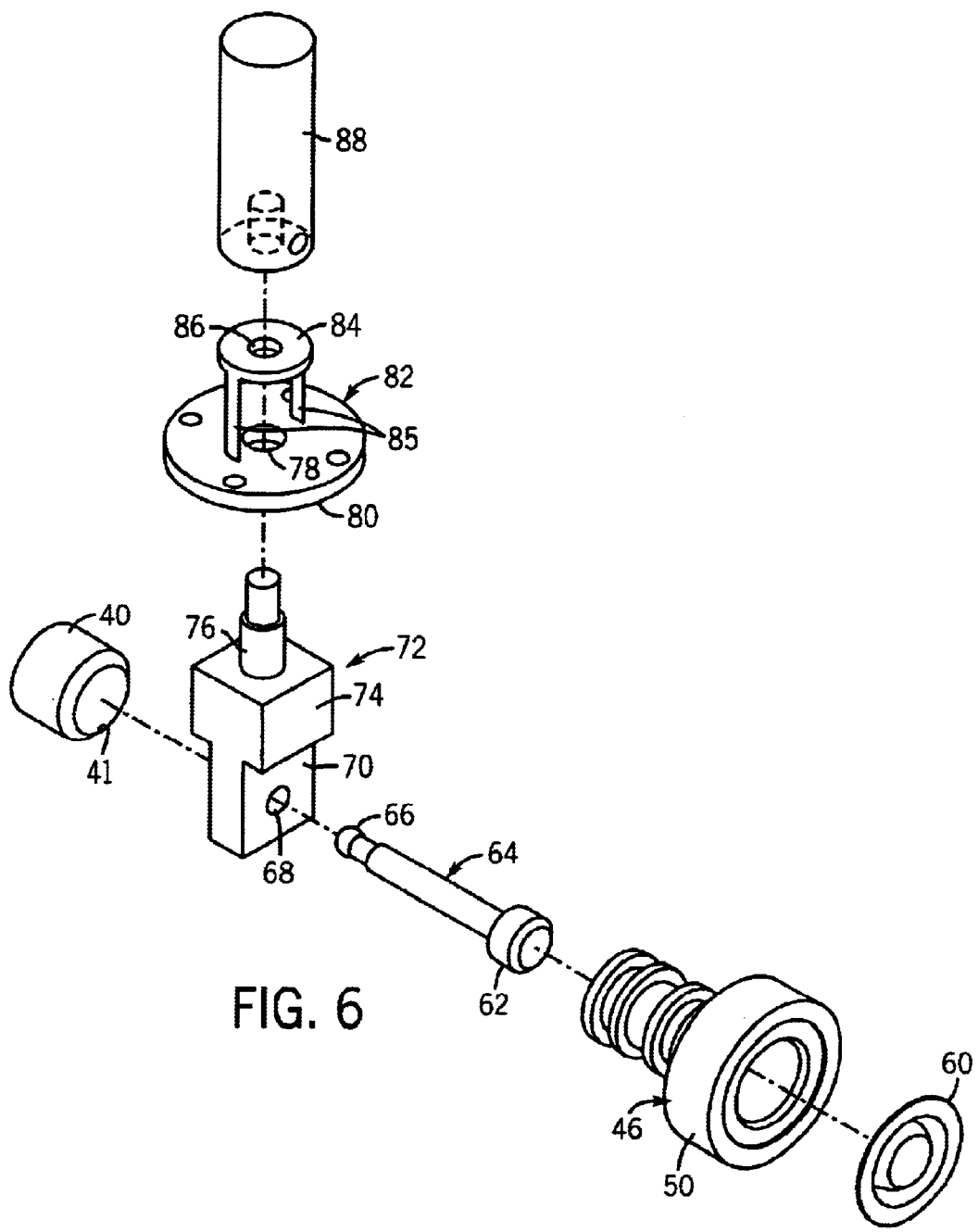
FIG. 6 is an exploded perspective view of the movable valve assembly of the valve of FIG. 3.
Figure 7:
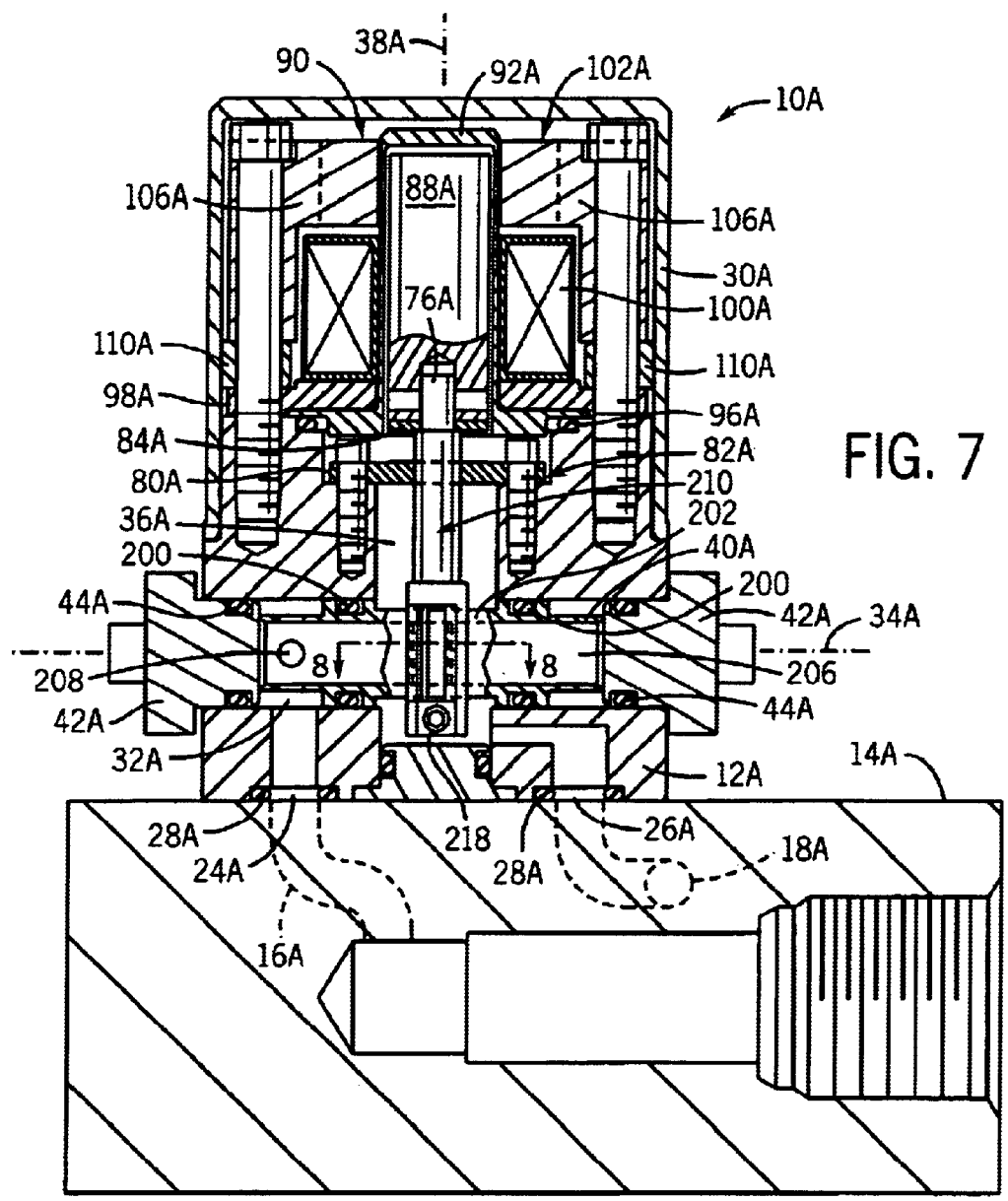
FIG. 7 is a cross-sectional view similar to FIG. 3 albeit of a second embodiment of the valve having a bridged clevis valve member.

Referring to FIGS. 3 and 6, the opposite end of the nozzle chamber 32 contains a piston sleeve 46 having a pair of o-rings 48 mating with the wall of the nozzle chamber 32. A flanged end 50 of the piston sleeve 46 is secured to the valve housing 12 by an end cap 52 bolted to the valve housing 12. The end cap 52 includes internal dampening porting 54 as well as a passageway 56 (in phantom) sealingly coupled to the balancing passageway 20 of the manifold block 14. The passageway 56 terminates at a small cavity 58 at an upstream side of a rolling diaphragm 60, having an area approximately the same as the nozzle orifice 41, pinched between the piston sleeve 46 and the end cap 52 to seal off cavity 58. The head 62 of a plunger or piston 64 fits against into the center of the diaphragm 60 on the opposite side of cavity 58. A ball end 66 fits into a socket 68 in a working end 70 of a flapper 72, which extends along the main axis 38 in the main chamber 36. Since the upstream side of the diaphragm 60 is at the same pressure as the fuel at the inlet port 24 the pressure forces acting on opposite sides of the working end of the flapper 72 are equalized thereby allowing it to control metering efficiently and responsively without the adverse impact on position arising from transient pressure forces.

The working end 70 of the flapper 72 is rectangular and sized slightly larger than the nozzle orifice 41. The flapper 72 has a wider shoulder 74 intermediate a cylindrical stepped diameter stem 76. The stem 76 fits through a central opening 78 (sized smaller than the shoulder 74 of the flapper 72) of a fixed part 80 of a flexure pivot 82 bolted to the valve housing 12 concentric with the main axis 38 to suspend the flapper 72 in the main chamber 36. The flexure pivot 82 has a movable part 84 connected to the fixed part 80 by two spokes 85. The spokes 85 are strong but slightly deflectable to allow relative movement of part 84 with respect to part 80. The movable part 84 has a central opening 86 fit over the smaller diameter section of the flapper stem 76. The movable part 84 and the flapper stem 76 are brazed together with an armature 88 of a magnetic drive assembly 90. The armature 88 is supported by the flexure pivot 82 in a magnetically inert guide sleeve 92 having a flanged end 94 which seals off the main chamber 28, via o-ring 96, by seating against the valve housing 12. The flanged end 94 of the guide sleeve 92 is held in place by an end plate 98 bolted to the valve housing 12 by bolts holding the drive assembly 90 in place.

In addition to the armature 88, the drive assembly 90 includes a wire coil 100 disposed about the guide sleeve 92 between the end plate 98 and a permanent magnet assembly 102. As shown in FIGS. 2 and 3, the permanent magnet assembly 102 includes two arch shaped permanent magnets 104 as well as two identical ferromagnetic pole pieces 106 arranged in a circular about the main axis 38. The pole pieces 106 extend in a direction parallel to the main axis 38 to fit around an outer diameter of the coil 100. Non-magnetic spacers 110 take up the gap between the ends of the pole pieces 106 and the end plate 98.

The drive assembly 90 thus provides a permanent magnet motor for driving the flapper 72. The pole pieces 106 become magnetized by the permanent magnets and establish north and south poles providing a uni-directional magnetic flux force acting on the armature 88 in the direction from the north pole to the south pole. When current is applied to the coil 100 it acts as an electromagnet providing magnetic flux lines acting on the armature 88 that vary depending on the input current to the coil 100, tending to add or subtract from the force of the permanent magnet flux. The guide sleeve 92 and spacers 110 do not effect the flux path because they are made of magnetically inert materials. The negative spring rate acting on the armature 88 from the magnetic flux lines is coupled with the positive spring rate of the flexure pivot 82 such that the combined force effect on the armature 88 is proportional to the input current to the coil 100. Thus, the net effect on the armature 88 is a force tending to move the armature 88 toward one of opposite sides of the main axis 38 where either of the pole pieces 106 reside.

Figure 4:
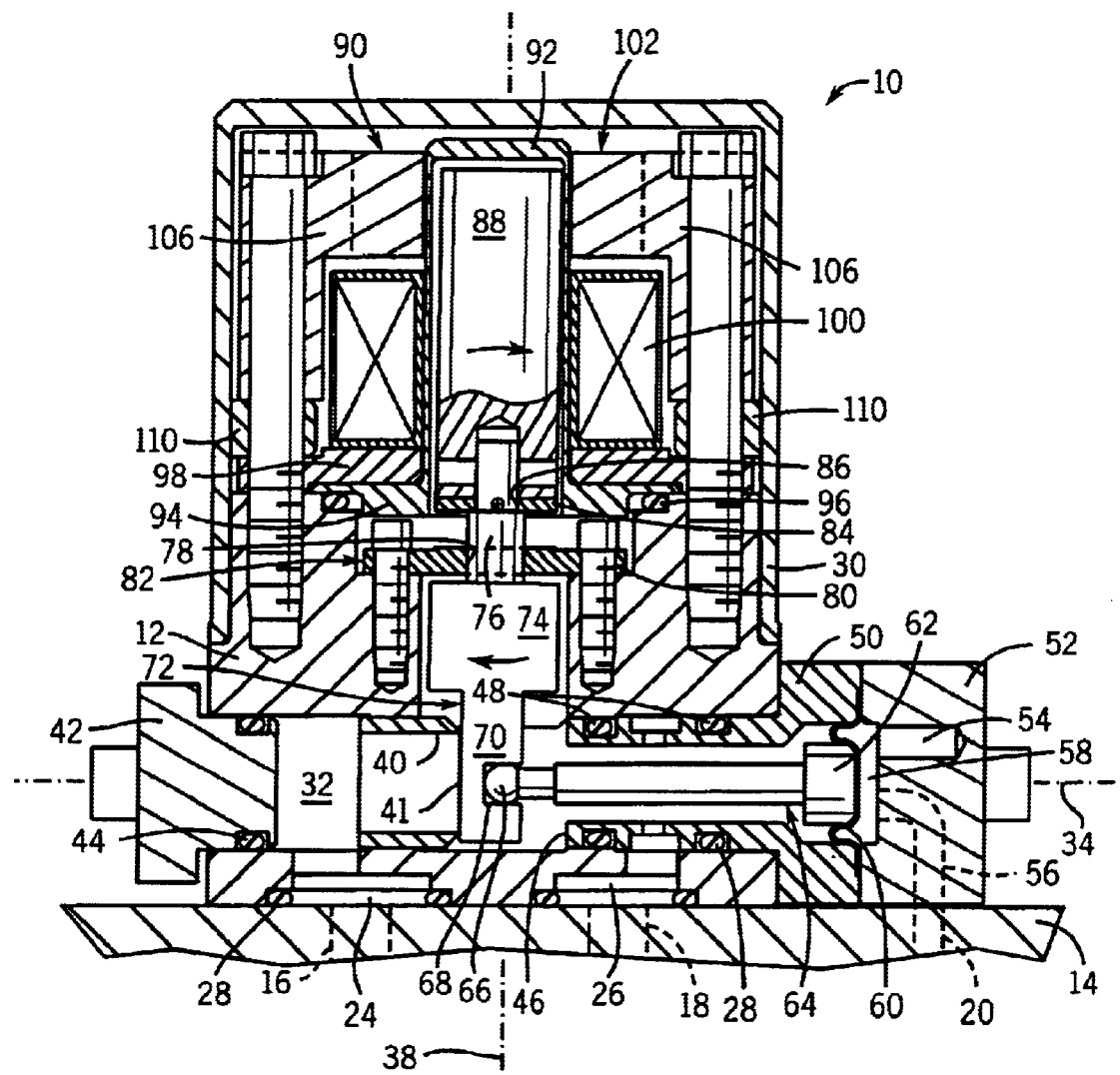
FIG. 4 is a slightly enlarged cross-sectional view of the valve of FIG. 3 albeit showing the flapper pivoted to closed position.
Figure 5:
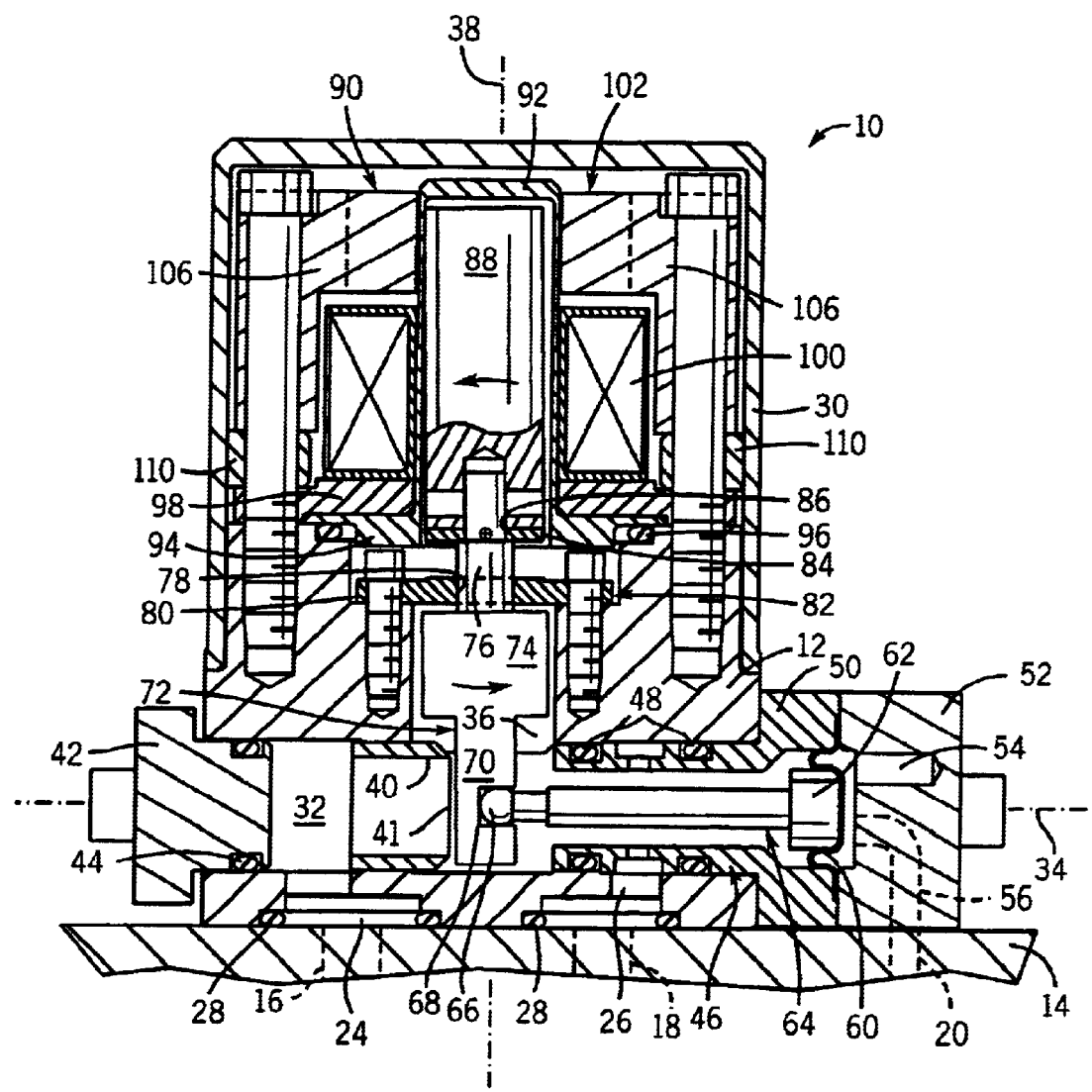
FIG. 5 is a view similar to FIG. 4 albeit showing the flapper pivoted to a fully open position.

Because the flapper 72 (and thereby the armature 88) are supported by the flexure pivot 82, driving the armature 88 side to side will cause the armature 88/flapper 72/movable part 84 assembly to pivot about the center of the fixed part 80 of the flexure pivot 82. Movement of the armature 88 toward the right (in FIG. 3) moves the working end of the flapper 72 toward the nozzle body 40 and vice versa. FIG. 3 shows the valve 10 with the flapper 72 in its resting position approximately at half stroke. The fully closed and open positions of the flapper 72 are shown in FIGS. 4 and 5, respectively. Note that in the preferred embodiment described herein, the flapper 72 does not completely seal the nozzle orifice 41, but rather allows a very small amount of leakage. Moreover, the amplitude of travel of the flapper is approximately 0.01 to 0.001 inches.

Referring to FIGS. 7–11, the bridged clevis embodiment of the valve will now be described. As mentioned, many of the components of this embodiment are the same as in the flapper embodiment of the valve and thus similar components of this embodiment will be described using similar reference numbers, albeit with the suffix "A".

This embodiment of the valve 10A can include an identical valve housing 12A having a cover 30A and mounted to an identical manifold block 14A (possibly modified to exclude the balancing passageway). Like before, the valve housing 12A has o-ring 28A sealed inlet 24A and outlet 26A ports allowing communication of fuel from inlet 16A and outlet 18A passageways in the manifold block 14A. The valve housing 12A defines a nozzle chamber 32A concentric with a nozzle axis 34A and a perpendicular main chamber 36A concentric with a main axis 38A. The open ends of the nozzle chamber 32A are sealed by plugs 42A having o-rings 44A and which are bolted to the valve housing 12A.

Figure 8:
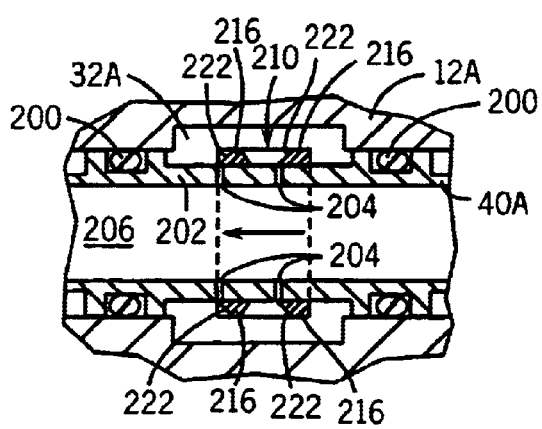
FIG. 8 is a partial cross-sectional view taken along line 8—8 of FIG. 7 showing the clevis fully closing off metering orifices.
Figure 9:
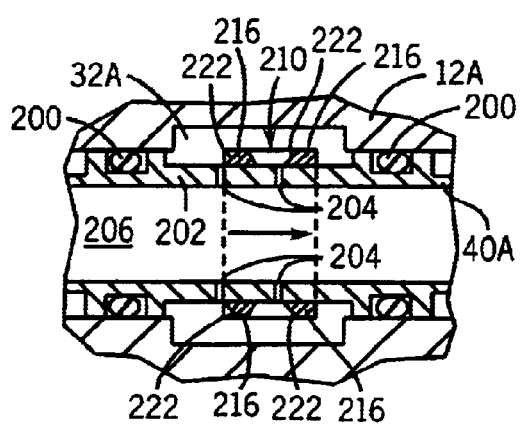
FIG. 9 is a view similar to FIG. 8 albeit showing the clevis in a fully open position.

A larger nozzle body 40A is disposed in the nozzle chamber 32A (held in place by the plugs 42A) and sealed by two o-rings 200 located on each side of a middle section 202 thereof having a square outer cross-section through each of two opposite sides of which are a pair of spaced apart slots extending in the direction of extension of the main axis 38A defining four nozzle orifices 204 (see FIGS. 8–10). The nozzle orifices 204 open to a nozzle passageway 206 leading to four openings 208 in the wall of the nozzle body 40A opening to the nozzle chamber 32A. Thus, fuel can flow from the inlet passageway 16A in the manifold block 14A, through the inlet port 24A in the valve housing 12A into the nozzle chamber 32A and then through the nozzle passageway 206 via openings 208. When open, fuel can exit the nozzle passageway 206 via the nozzle orifices 204 and then pass from the valve housing 12A via outlet port 26A to the outlet passageway 18A in the manifold block 14A and onto the combustion can of the gas turbine engine.

The nozzle orifices 204 are controlled by a bridged clevis assembly 210 (shown in FIG. 11). The bridged clevis assembly 210 includes a Y-shaped clevis 212 having a cylindrical stepped diameter stem 76A extending along the main axis 38A in the main chamber 36A and an opposite forked end 214 within the nozzle chamber 32A straddling the square section 202 of the nozzle body 40A. The forked end 214 has two spaced apart slotted prongs defining two pair of legs 216 joined at their terminal ends where a bridge block 218 is mounted by a bolt 220 threaded into the clevis 212. The legs 216 each have a tapered leading edge 222 to lower shear forces during operation and are spaced apart such that they each cover an equal portion of the nozzle orifices 204. The symmetric configuration of the clevis 212 makes it inherently balanced since the same pressure forces will act on each one of the prongs.

As before, the clevis stem 76A is brazed to a movable part 84A of a flexure pivot 82A, having a fixed part 80A bolted to the valve housing 12, together with an armature 88A of a magnetic drive assembly 90A. The flexure pivot 82A supports the clevis assembly 210 and the armature 88A exactly as described above with respect to the flapper valve member embodiment of the valve. Furthermore, the drive assembly 90A is identical to that previously described, including a wire coil 100A, a permanent magnet assembly 102A with two arched shaped permanent magnets and two pole pieces 106A. And, as before, the armature 88A is disposed in a magnetically inert guide sleeve 92A sealing off the main chamber 28A, via o-ring 96A and held in place by an end plate 98A spaced from the pole pieces 106A by non-magnetic spacers 110A.

Thus, the net effect on the armature 88A is a force tending to move the armature 88A toward one of opposite sides of the main axis 38A where either of the pole pieces 106A reside. Again, because the clevis assembly 210 and the armature 88A are supported by the flexure pivot 82A, driving the armature 88A side to side will cause the armature 88A/clevis assembly 210/movable part 84A to pivot about the center of the fixed part 80A of the flexure pivot 82A.

Movement of the armature 88A to the right (in FIG. 7) moves the forked end 214 of the clevis 212 to the left to close off the nozzle orifices 304 simultaneously. The fully open and closed positions of the clevis assembly 210 are shown in FIGS. 8 and 9, respectively.

Thus, the above description describes two embodiments of a valve of the present invention suitable for use in an active combustion control system for controlling pressure fluctuations in the combustion chamber of a gas turbine. The valve is able to operate at very high rates required in such applications due to the pressure balancing, low mass and low drag of the valve member. The construction of the valve member also permits close mating clearances to be maintained constantly between the nozzle passageway and the valve member with large variations in pressure drops across the metering ports.

In operation as a part of an active combustion control system, the valve can be operated rapidly by a high speed controller or computer to vary the input current to the drive assembly (and thus vary the metering proportionally thereto) in response to pressure signals sent by a pressure transducer to counter and thus reduce the pressure fluctuations. For example, if a pressure increase is sensed by the pressure transducer the controller can rapidly change the input current to the valve to throttle the nozzle and reduce flow into the combustion chamber. The system does the opposite when low pressures are detected.

It should be appreciated that merely preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

I claim:

1. A fuel metering valve capable of operating in an active combustion control system of a gas turbine, the valve comprising:

a valve housing having an inlet port and an outlet port;

a nozzle passageway disposed between the inlet and outlet port;

a drive assembly disposed in the valve housing and having a movable actuator member disposed along a main axis;

a flexure pivot mounted to the housing and the actuator member to allow pivoting of the actuator member with respect to the main axis; and a valve member mounted to be disposed along the main axis and to pivot about the flexure pivot with the actuator member to control flow through the nozzle passageway;

wherein the valve member is a clevis having a stem mounted to the actuator member and a forked end defining two prongs located to interrupt flow through a pair of nozzle orifices leading from the nozzle passageway.

2. The valve of claim 1, wherein the actuator and valve member move in proportion to an input current to the drive assembly.

3. The valve of claim 1, wherein the flexure pivot has a movable part and a non-moving part in a plane spaced from the movable part and joined thereto by a flexible spoke.

4. The valve of claim 1, wherein the drive assembly includes a permanent magnet and an electromagnet including a wire coil disposed about a movable armature actuator member.

5. The valve of claim 4, wherein the armature is selectively pulled by magnetic flux toward opposite sides of the main axis causing the valve member to pivot with respect to the main axis and move with respect to the nozzle passageway.

6. The valve of claim 1, wherein the valve member is pressure balanced.

7. The valve of claim 1, wherein the nozzle orifices are slots formed in a valve sleeve defining the nozzle passageway disposed in the valve housing.

8. The valve of claim 7, wherein each of the prongs has an elongated tapered leading edge.

9. The valve of claim 8, wherein a bridge is mounted between the two prongs of the clevis.

10. The valve of claim 9, wherein the valve sleeve defines two pairs of spaced apart nozzle orifices and each prong of the clevis member defines two legs spaced apart in registration with the outlet orifices, such that pivoting of the clevis member moves each leg of the clevis member the same distance with respect to its associated nozzle orifice.

11. The valve of claim 10, wherein the nozzle orifices are formed in opposite walls of a section of the valve sleeve having a rectilinear outer periphery disposed between the prongs of the clevis and the bridge.

12. A fuel metering valve capable of operating in an active combustion control system of a gas turbine, the valve comprising:

a valve housing having an inlet port and an outlet port;

a nozzle passageway disposed between the inlet and outlet port;

a magnetic drive assembly disposed in the valve housing and having an armature disposed along a main axis and selectively pulled toward opposite sides of the main axis;

a flexure pivot disposed about the main axis and having a movable part mounted to the armature and a non-moving part fixed to the housing to allow pivoting of the actuator member with respect to the main axis; and a clevis member mounted to the armature and the movable part of the flexure pivot at one end and having a forked end defining two prongs symmetrical about the main axis and each adapted to control flow through an associated orifice of the nozzle passageway when the clevis is pivoted about the flexure pivot in response to movement of the armature.

* * * * *